(12) United States Patent
Islam et al.

(10) Patent No.: US 7,765,331 B2
(45) Date of Patent: Jul. 27, 2010

(54) INTEGRATED RAID CONTROLLER AND SAS SWITCH

(75) Inventors: Rezaul Shah Mohammad Islam, Tucson, AZ (US); Gregg Steven Lucas, Tucson, AZ (US); Kenneth Robert Schneebeli, San Jose, CA (US); Theodore Brian Vojnovich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 11/554,092

(22) Filed: Oct. 30, 2006

(65) Prior Publication Data

US 2008/0147844 A1    Jun. 19, 2008

(51) Int. Cl.
 *G06F 15/173* (2006.01)
(52) U.S. Cl. .................. 709/253; 709/223; 709/224
(58) Field of Classification Search .......... 709/223, 709/224, 253
See application file for complete search history.

(56) References Cited

U.S. PATENT DOCUMENTS 6,047,908 A    4/2000   Seymour et al.

| | | |
|---|---|---|
| 2001/0049740 A1 | 12/2001 | Karpoff |
| 2002/0062454 A1 | 5/2002 | Fung |
| 2003/0048613 A1 | 3/2003 | Garnett et al. |
| 2004/0088574 A1 | 5/2004 | Walter et al. |
| 2005/0021606 A1* | 1/2005 | Davies et al. ............... 709/203 |
| 2005/0044284 A1 | 2/2005 | Pescatore |

FOREIGN PATENT DOCUMENTS

| EP | 1357463 A3 | 10/2003 |
|---|---|---|
| EP | 1582970 A1 | 10/2005 |

OTHER PUBLICATIONS

Mason et al., "Serial Attached SCSI Spreads as a Fabric Connection", http://snseurope.com/snslink/news/printer-friendly.php?newsid=3331, printed Jan. 31, 2008, 3 pages.

* cited by examiner

*Primary Examiner*—Wing F Chan
*Assistant Examiner*—Andrew Woo
(74) *Attorney, Agent, or Firm*—Stephen R. Tkacs; Stephen J. Walder, Jr.; Randall J. Bluestone

(57) ABSTRACT

A blade server system includes a plurality of blade slots, a management module, and a plurality of switch modules. The switch modules provide connectivity to a plurality of communications fabrics. At least one switch module includes an integrated redundant array of independent disks (RAID) controller. A storage enclosure may be connected to the switch with the integrated RAID controller without having to include a stand-alone RAID controller, such as in one of the blade slots, and without having to include a RAID controller within the storage enclosure.

18 Claims, 3 Drawing Sheets

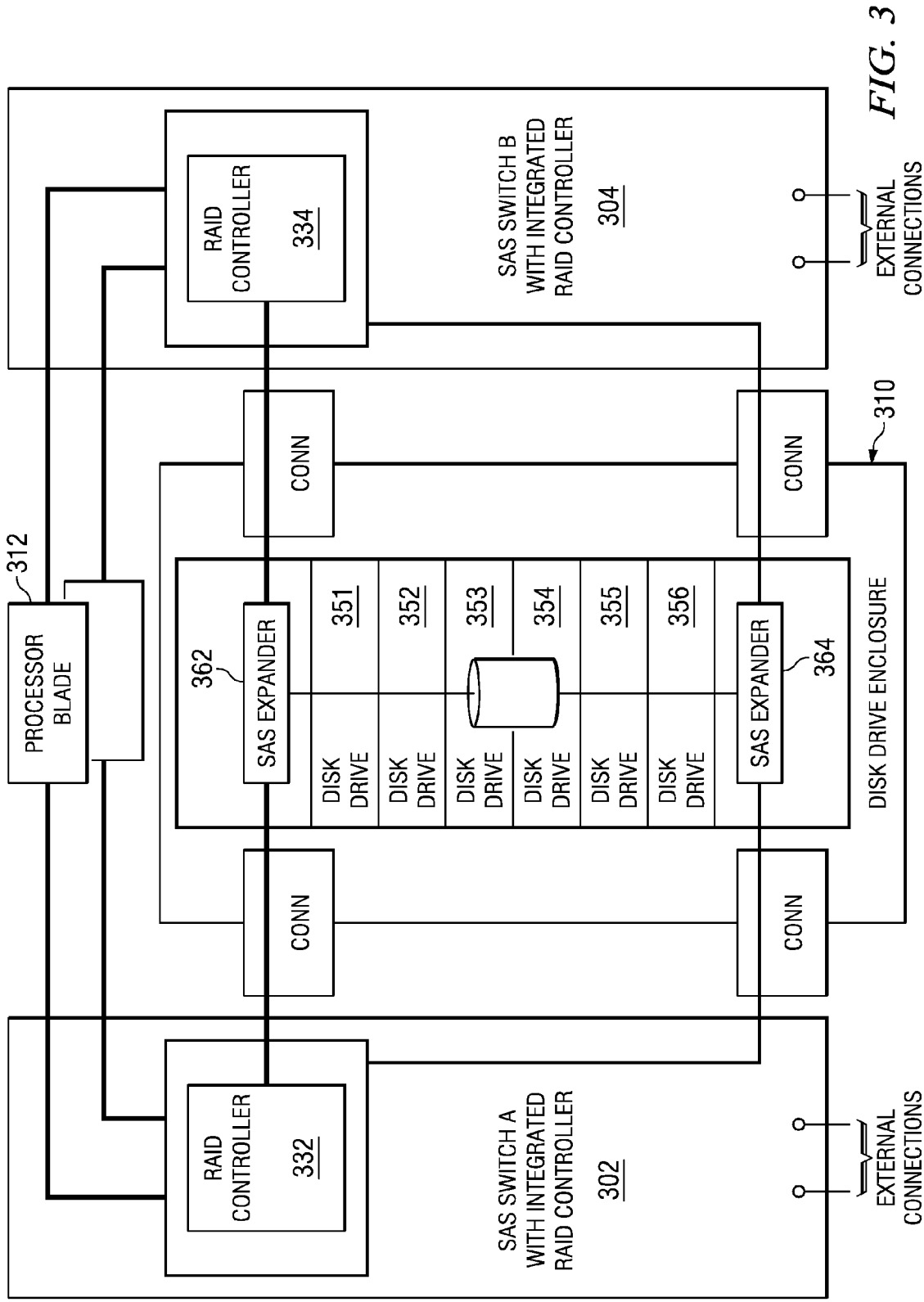

INTEGRATED RAID CONTROLLER AND SAS SWITCH

BACKGROUND

1. Technical Field

The present application relates generally to an improved data processing system and method. More specifically, the present application is directed to an integrated redundant array of independent disk controller and serial attached small computer system interface switch for a blade server system.

2. Description of Related Art

In some systems, a collection of servers is interconnected into a server system, sharing high-speed fabric topologies, such as in BladeCenter® systems. "BladeCenter" is a trademark of International Business Machines Corporation in the United States, other countries, or both. A BladeCenter® system is a server architecture that houses multiple server modules ("blades") in a single chassis. Blade servers are widely used in datacenters to save space and improve system management. Either self-standing or rack mounted, the chassis provides the power supply. Each blade may have its own CPU, memory, and hard disk. Blade servers generally provide their own management systems and may include a network or storage switch.

Most computer systems require storage and a means of accessing the storage. Storage may be accessed by means of redundant array of independent disks (RAID) controllers, either singular or redundant. For example, in some current BladeCenter® configurations, myriad server blades are populated and interconnected to a shared fabric. Appropriate switch modules are also populated and interface the fabric to RAID controllers within the BladeCenter® system. The RAID controllers in turn provide connectivity to the fundamental storage, such as hard disk drives.

BladeCenter® systems are transitioning from external storage to internal storage, whereby customers can achieve a "store-in-a-box" solution. Such products constitute server blades, RAID controller blades, storage blades, and switch modules to interconnect them all. This requires a multitude of blade slots and precious volume within the BladeCenter® chassis.

SUMMARY

The illustrative embodiments recognize the disadvantages of the prior art and provide a redundant array of independent disks controller integrated within a switch module in a blade server system. A blade server system includes a plurality of blade slots, a management module, and a plurality of switch modules. The switch modules provide connectivity to a plurality of communications fabrics. At least one switch module includes an integrated redundant array of independent disks (RAID) controller. A storage enclosure may be connected to the switch with the integrated RAID controller without having to include a stand-alone RAID controller, such as in one of the blade slots, and without having to include a RAID controller within the storage enclosure.

In one illustrative embodiment, a blade server system comprises a plurality of blade slots within a chassis of the blade server system, at least one processor blade in a given blade slot within the plurality of blade slots, and at least one switch module within the chassis of the blade server system. The at least one switch module provides connectivity to a communications fabric and is connected to the plurality of blade slots via an internal fabric within the blade server system. A given switch module within the at least one switch module has a redundant array of independent disks controller integrated within the given switch module. The given switch module is connected to a storage enclosure. The processor blade connects to the storage enclosure via the internal fabric, the given switch module, and the communications fabric. The processor blade accesses the storage enclosure using the redundant array of independent disks controller integrated within the given switch module. The storage enclosure comprises one or more storage devices.

In one exemplary embodiment, the given switch module is a serial attached small computer systems interface switch module. The communications fabric is a serial attached small computer systems interface fabric.

In another exemplary embodiment, the storage enclosure is an external storage enclosure. In a further exemplary embodiment, the storage enclosure is an internal storage enclosure that is located within a chassis of the blade server system. In a still further exemplary embodiment, the storage enclosure is a blade in one of the plurality of blade slots.

In yet another exemplary embodiment, the storage enclosure includes a plurality of hard disk drives. In another exemplary embodiment, the switch module provides connectivity to an InfiniBand fabric, an Ethernet fabric, or a serial attached small computer systems interface fabric. In one exemplary embodiment, the blade server system further comprises a management module that monitors components within the blade server system.

In another illustrative embodiment, a blade server system comprises a plurality of blade slots within a chassis of the blade server system, a processor blade in a first blade slot within the plurality of blade slots, and at least one switch module within the chassis of the blade server system. The at least one switch module provides connectivity to a communications fabric and is connected to the plurality of blade slots via an internal fabric. A given switch module within the at least one switch module has a redundant array of independent disks controller integrated within the given switch module. The blade server system further comprises a storage blade in a second blade slot within the plurality of blade slots. The storage blade is located within a chassis of the blade server system and comprises a plurality of storage devices. The processor blade accesses the plurality of storage devices via the given switch module and the redundant array of independent disks controller integrated within the given switch module.

In one exemplary embodiment, the given switch module is a serial attached small computer systems interface switch module. The communications fabric is a serial attached small computer systems interface fabric.

In another exemplary embodiment, the switch module provides connectivity to an InfiniBand fabric. In a further exemplary embodiment, the switch module provides connectivity to an Ethernet fabric. In another exemplary embodiment, the blade server system further comprises a management module that monitors components within the blade server system.

In a further illustrative embodiment, a method is provided for providing a blade server system. The method comprises providing a blade server system with a plurality of blade slots within a chassis of the blade server system and providing at least one switch module within the chassis of the blade server system. The at least one switch module provides connectivity to a communications fabric and is connected to the plurality of blade slots via an internal fabric within the blade server system. A given switch module within the at least one switch module has redundant array of independent disks controller integrated within the given switch module. The method further comprises installing a processor blade in a given blade slot within the plurality of blade slots and connecting the given switch module to a storage enclosure. The storage enclosure comprises one or more storage devices.

In one exemplary embodiment, the given switch module is a serial attached small computer systems interface switch module and the communications fabric is a serial attached small computer systems interface fabric. In a further exemplary embodiment, the storage enclosure is an external storage enclosure.

In another exemplary embodiment, the storage enclosure is an internal storage enclosure that is located within a chassis of the blade server system. In a further exemplary embodiment, the storage enclosure is a blade in one of the plurality of blade slots. In another exemplary embodiment, the storage enclosure includes a plurality of hard disk drives. In yet another exemplary embodiment, the switch module provides connectivity to an InfiniBand fabric, an Ethernet fabric, or a serial attached small computer systems interface fabric.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 illustrates connectivity of processor blades connected to a disk drive enclosure through switches in a blade server system with integrated RAID controller and SAS switch in accordance with one illustrative embodiment.

DETAILED DESCRIPTION OF THE ILLUSTRATIVE EMBODIMENTS

Figure 1:
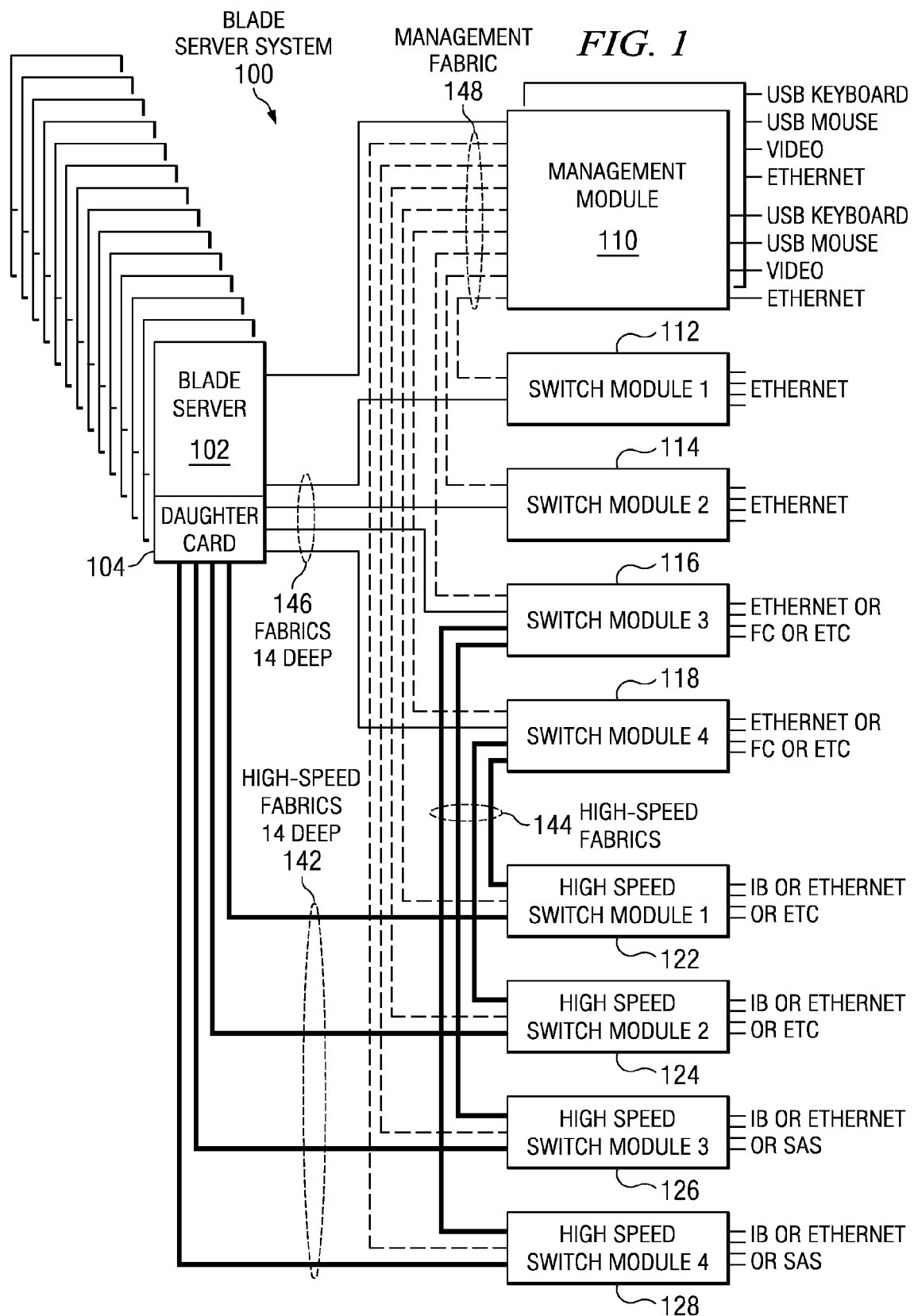
FIG. 1 depicts a pictorial representation of an exemplary blade server system in which aspects of the illustrative embodiments may be implemented.

With reference now to the figures and in particular with reference to FIG. 1, an exemplary diagram of a data processing environment is provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environment may be made without departing from the spirit and scope of the present invention.

With reference now to the figures, FIG. 1 depicts a pictorial representation of an exemplary blade server system in which aspects of the illustrative embodiments may be implemented. Blade server system 100 may include a plurality of blade servers 102, each having a corresponding daughter card 104. In the depicted example, blade server system includes fourteen blade servers; however, more or fewer blade slots may be included depending upon the implementation. A server blade may be a processor blade, a storage blade, or the like.

Switch modules 1-4 112-118 provide connectivity to Ethernet, for example. Blade servers 102 and daughter cards 104 connect to switch modules 112-118 through fabrics 146 (14 deep for the 14 blade servers in this example).

High speed switch module 1 122 and high speed switch module 2 124 provide connectivity to InfiniBand (IB), Ethernet, or the like. High speed switch module 3 126 and high speed switch module 4 128 provide connectivity to IB, Ethernet, or serial attached small computer systems interface (serial attached SCSI or SAS).

Blade servers 102 and daughter cards 104 connect to high speed switch modules 122-128 via high-speed fabrics 142. These high-speed fabrics are 14 deep for the 14 blade servers in this example). Also, high-speed fabrics 144 connect switch modules 116, 118, and high speed switch modules 122-128.

Blade server system 100 also includes management module 110. Management module 110 performs various management functions for blade server system 100, such as monitoring the system and its associated blade servers 102, daughter cards 104, switch modules 112-118, 122-128, and the like. The components of blade server system 100 are connected to management module 110 through management fabric 148.

Those of ordinary skill in the art will appreciate that the hardware in FIG. 1 may vary depending on the implementation. Other internal hardware or peripheral devices, such as fans, power supplies, and the like, may be used in addition to, or in place of, the hardware depicted in FIG. 1. Also, the processes of the illustrative embodiments may be applied to a data processing system other than the blade server system mentioned above, without departing from the spirit and scope of the illustrative embodiments.

Figure 2:
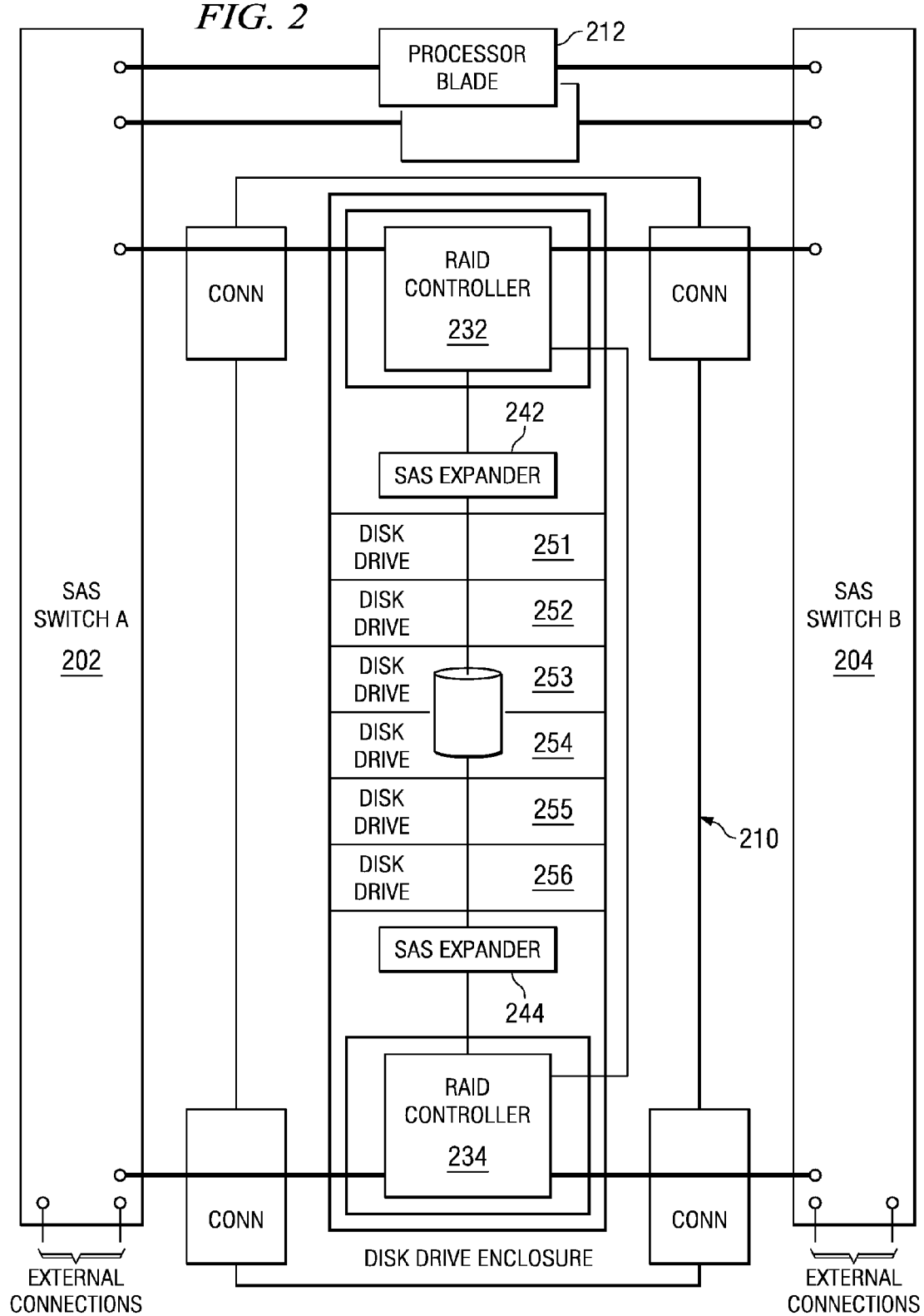
FIG. 2 illustrates connectivity of processor blades connected to a disk drive enclosure through switches in a blade server system in accordance with one illustrative embodiment.

FIG. 2 illustrates connectivity of processor blades connected to a disk drive enclosure through switches in a blade server system in accordance with one illustrative embodiment. Processor blades 212 connect to serial attached SCSI (SAS) switch A 202 and SAS switch B 204. Switch modules, such as switches 202, 204, may be used in pairs for redundancy. Processor blades 212 and SAS switches 202, 204 may be internal to a blade server system, such as blade server system 100 shown in FIG. 1. More particularly, processor blades 212 may be one of blade servers 102, and SAS switches 202, 204 may be switch modules 116, 118, for example.

Disk drive enclosure 210 may be an external storage enclosure or an internal enclosure, which may be a blade itself. Disk drive enclosure 210 includes redundant array of independent disks (RAID) controller 232 and RAID controller 234. RAID controllers 232, 234 connect to disk drives 251-256 via internal SAS switches 242, 244. RAID controllers 232, 234 also connect to SAS switches 202, 204 via legacy connectors (LG Conn).

In next generation BladeCenter® systems, the design is optimized for compactness and low-cost, while still requiring some high-end features, such as RAID controllers for managing storage. Blade slots are at a premium, so some slots will be designated for server blades and other slots will be designated for storage. However, using a slot for a RAID controller or including a RAID controller in a storage blade takes up valuable volume, and blade slots, in the blade server system.

In accordance with an illustrative embodiment, the RAID controller is integrated within the switch module. The switch module is located in the blade server system. Therefore, the RAID controller does not take up a blade slot. Alternatively, a storage blade need not include the RAID controller and, thus, takes up less volume, or blade slots, or may include more storage.

FIG. 3 illustrates connectivity of processor blades connected to a disk drive enclosure through switches in a blade server system with integrated RAID controller and SAS switch in accordance with one illustrative embodiment. Processor blades 312 connect to serial attached SCSI (SAS) switch A 302 and SAS switch B 304. Switch modules, such as switches 302, 304, may be used in pairs for redundancy. Processor blades 312 and SAS switches 302, 304 may be internal to a blade server system, such as blade server system 100 shown in FIG. 1. More particularly, processor blades 312 may be one of blade servers 102, and SAS switches 302, 304 may be switch modules 116, 118, for example. In accordance with an illustrative embodiment, SAS switch 302 includes RAID controller 332, and SAS switch 304 includes RAID controller 334.

Disk drive enclosure 310 may be an external storage enclosure or an internal enclosure, which may be a blade itself. Disk drive enclosure 310 includes SAS expander 362 and SAS expander 364. An expander expands communication to a plurality of channels for a SAS port. SAS expanders 362, 364 connect to disk drives 351-356. Disk drives 351-356 may be a plurality of hard disk drives, for example. However, a person of ordinary skill will recognize that enclosure 310 may house other types of storage devices, such as tape drives, optical storage devices, and the like.

Thus, the illustrative embodiments solve the disadvantages of the prior art by providing a serial attached SCSI (SAS) switch with an integrated RAID controller. There is an incremental cost associated with integrating the RAID controller into the SAS switch; however, this cost is much less than adding a stand-alone RAID controller. Also, integrating the RAID controller with the switch module saves space. There is no need for a stand-alone RAID controller to take up a valuable blade slot. There is also no need to include a RAID controller in an internal storage enclosure, such as a storage blade; therefore, a storage blade may take up less space or include more storage in the same volume.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A blade server system, comprising:
   a plurality of blade slots within a chassis of the blade server system;
   at least one switch module within the chassis of the blade server system, wherein the at least one switch module provides connectivity to a communications fabric and is connected to the plurality of blade slots via an internal fabric within the blade server system, wherein a given switch module within the at least one switch module has a redundant array of independent disks controller integrated within the given switch module;
   a processor blade in a given blade slot within the plurality of blade slots,
   wherein the given switch module is connected to a storage enclosure, wherein the processor blade connects to the storage enclosure via the internal fabric, the given switch module, and the communications fabric, wherein the processor blade accesses the storage enclosure using the redundant array of independent disks controller integrated within the given switch module, and wherein the storage enclosure comprises one or more storage devices; and
   a management module that monitors components within the blade server system.

2. The blade server system of claim 1, wherein the given switch module is a serial attached small computer systems interface switch module and wherein the communications fabric is a serial attached small computer systems interface fabric.

3. The blade server system of claim 1, wherein the storage enclosure is an external storage enclosure.

4. The blade server system of claim 1, wherein the storage enclosure is an internal storage enclosure that is located within a chassis of the blade server system.

5. The blade server system of claim 4, wherein the storage enclosure is a blade in one of the plurality of blade slots.

6. The blade server system of claim 1, wherein the storage enclosure includes a plurality of hard disk drives.

7. The blade server system of claim 1, wherein the switch module provides connectivity to an InfiniBand fabric, an Ethernet fabric, or a serial attached small computer systems interface fabric.

8. A blade server system, comprising:
   a plurality of blade slots within a chassis of the blade server system;
   at least one switch module within the chassis of the blade server system, wherein the at least one switch module provides connectivity to a communications fabric and is connected to the plurality of blade slots via an internal fabric, wherein a given switch module within the at least one switch module has a redundant array of independent disks controller integrated within the given switch module;
   a processor blade in a first blade slot within the plurality of blade slots;
   a storage blade in a second blade slot within the plurality of blade slots, wherein the storage blade is located within a chassis of the blade server system and comprises a plurality of storage devices,
   wherein the processor blade accesses the plurality of storage devices via the given switch module and the redundant array of independent disks controller integrated within the given switch module; and
   a management module that monitors components within the blade server system.

9. The blade server system of claim 8, wherein the given switch module is a serial attached small computer systems interface switch module and wherein the communications fabric is a serial attached small computer systems interface fabric.

10. The blade server system of claim 8, wherein the switch module provides connectivity to an InfiniBand fabric.

11. The blade server system of claim 10, wherein the switch module provides connectivity to an Ethernet fabric.

12. A method for providing a blade server system, the method comprising:
   providing a blade server system with a plurality of blade slots within a chassis of the blade server system;
   providing a management module within the chassis of the blade server system wherein the management module monitors components within the blade server system;
   providing at least one switch module within the chassis of the blade server system, wherein the at least one switch module provides connectivity to a communications fabric and is connected to the plurality of blade slots via an internal fabric within the blade server system, wherein a given switch module within the at least one switch module has a redundant array of independent disks controller integrated within the given switch module;

installing a processor blade in a given blade slot within the plurality of blade slots; and connecting the given switch module to a storage enclosure, wherein the processor blade connects to the storage enclosure via the given switch module and the communications fabric, wherein the processor blade accesses the storage enclosure using the redundant array of independent disks controller integrated within the given switch module, and wherein the storage enclosure comprises one or more storage devices.

13. The method of claim 12, wherein the given switch module is a serial attached small computer systems interface switch module and wherein the communications fabric is a serial attached small computer systems interface fabric.

14. The method of claim 12, wherein the storage enclosure is an external storage enclosure.

15. The method of claim 12, wherein the storage enclosure is an internal storage enclosure that is located within a chassis of the blade server system.

16. The method of claim 15, wherein the storage enclosure is a blade in one of the plurality of blade slots.

17. The method of claim 12, wherein the storage enclosure includes a plurality of hard disk drives.

18. The method of claim 12, wherein the switch module provides connectivity to an InfiniBand fabric, an Ethernet fabric, or a serial attached small computer systems interface fabric.

* * * * *